US005608404A

United States Patent [19]
Burns et al.

[11] Patent Number: 5,608,404
[45] Date of Patent: Mar. 4, 1997

[54] IMAGING SYNTHETIC APERTURE RADAR

[75] Inventors: Bryan L. Burns, Tijeras; J. Thomas Cordaro, Albuquerque, both of N.M.

[73] Assignee: The United States of America as represented by the United States Department of Energy, Washington, D.C.

[21] Appl. No.: 81,462

[22] Filed: Jun. 23, 1993

[51] Int. Cl.⁶ .................................................. G01S 13/90
[52] U.S. Cl. ............................................................ 342/25
[58] Field of Search ................................................ 342/25

[56] References Cited

U.S. PATENT DOCUMENTS

| | | | |
|---|---|---|---|
| 3,918,054 | 11/1975 | Collins | 342/192 |
| 4,011,562 | 3/1977 | Bruce | 342/46 |
| 4,034,370 | 7/1977 | Mims | 342/25 |
| 4,219,811 | 8/1980 | Herman et al. | 342/25 |
| 4,292,634 | 9/1981 | Wu et al. | 342/25 |
| 4,339,752 | 7/1982 | Williams et al. | 342/25 |
| 4,371,946 | 2/1983 | Constantinides et al. | 364/822 |
| 4,462,032 | 7/1984 | Martin | 342/25 |
| 4,471,357 | 9/1984 | Wu et al. | 342/25 |
| 4,509,048 | 4/1985 | Jain | 342/25 |
| 4,725,841 | 2/1988 | Nysen et al. | 342/44 |
| 4,758,838 | 7/1988 | Maeda et al. | 342/25 |
| 4,771,287 | 9/1988 | Mims | 342/25 |
| 4,825,213 | 4/1989 | Smrek | 342/25 |
| 4,847,624 | 7/1989 | Hopwood et al. | 342/201 |
| 4,851,848 | 7/1989 | Wehner | 342/25 |
| 4,893,287 | 1/1990 | Stratton et al. | 342/116 X |
| 5,128,680 | 7/1992 | Sabato et al. | 342/60 |
| 5,179,383 | 1/1993 | Raney et al. | 342/25 |
| 5,250,952 | 10/1993 | Roth | 342/25 |
| 5,343,203 | 8/1994 | Chen | 342/25 |
| 5,430,445 | 7/1995 | Peregrim et al. | 342/25 |

OTHER PUBLICATIONS

D. Ausherman et al., "Developments in Radar Imaging", IEEE Transactions On Aerospace and Electronic Systems, vol. AES–20, No. 4, Jul. 1984.

K. Tomiyasu, "Tutorial Review of Synthetic–Aperture Radar (SAR) with Applications to Imaging of the Ocean Surface", *Proceedings of the IEEE*, vol. 66, No. 5, pp. 563–584, May 1978.

(List continued on next page.)

*Primary Examiner*—John B. Sotomayor
*Attorney, Agent, or Firm*—Luis M. Ortiz; James H. Chafin; William R. Moser

[57] ABSTRACT

A linear-FM SAR imaging radar method and apparatus to produce a real-time image by first arranging the returned signals into a plurality of subaperture arrays, the columns of each subaperture array having samples of dechirped baseband pulses, and further including a processing of each subaperture array to obtain coarse-resolution in azimuth, then fine-resolution in range, and lastly, to combine the processed subapertures to obtain the final fine-resolution in azimuth. Greater efficiency is achieved because both the transmitted signal and a local oscillator signal mixed with the returned signal can be varied on a pulse-to-pulse basis as a function of radar motion. Moreover, a novel circuit can adjust the sampling location and the A/D sample rate of the combined dechirped baseband signal which greatly reduces processing time and hardware. The processing steps include implementing a window function, stabilizing either a central reference point and/or all other points of a subaperture with respect to doppler frequency and/or range as a function of radar motion, sorting and compressing the signals using a standard fourier transforms. The stabilization of each processing part is accomplished with vector multiplication using waveforms generated as a function of radar motion wherein these waveforms may be synthesized in integrated circuits. Stabilization of range migration as a function of doppler frequency by simple vector multiplication is a particularly useful feature of the invention; as is stabilization of azimuth migration by correcting for spatially varying phase errors prior to the application of an autofocus process.

23 Claims, 5 Drawing Sheets

OTHER PUBLICATIONS

B. Arambepola, "New Architecture For a Real–Time SAR Processor", Proceedings of the IGARSS '88 Symposium, pp. 691–694, Sep. 1988.

K. Liu et al., "Spacecraft On–Board SAR Image Generation for Eos–Type Missions", *IEEE Transactions on Geoscience and Remote Sensing*, vol. 27, No. 2, pp. 184–192, Mar. 1989.

J. Mims et al., "Synthetic Aperture Imaging With Maneuvers", *IEEE Transactions on Aerospace and Electronic Systems*, vol. AES–8, No. 4, pp. 192–200, Jul. 1972.

W. Brown et al., "Range–Doppler Imaging with Motion Through Resolution Cells", *IEEE Transactions on Aerospace and Electronic Systems*, vol. AES–5, No. 1, pp. 98–102, Jan. 1969.

IMAGING SYNTHETIC APERTURE RADAR

BACKGROUND OF THE INVENTION

The invention herein relates to the field of imaging synthetic aperture radars. More particularly, the invention relates to a linear-FM, synthetic aperture radar (SAR) which implements overlapped-subaperture real-time processing to correct for motion through resolution cells.

As with many applications of imaging devices, the finer the resolution the more useful the imaging devices become; however, the spatial resolution achievable by an antenna, without any coherent processing, is inversely proportional to the antenna's aperture. Thus, for fine resolution, a large antenna is required. To overcome the inability to place a large antenna on an imaging system in motion such as an aircraft or satellite, SAR samples a large aperture by positioning a small antenna at well defined locations along the large aperture. These samples are then coherently combined in the radar's signal processor to generate, synthetically, the resolution appropriate for the aperture traveled by the small antenna. In order to coherently combine the samples, the relative position of the antenna must be known to within a fraction of a wavelength. If the synthetic aperture to be sampled by the radar is a straight line, components of motion away from the line degrade the coherent combination of the samples of the synthetic aperture. The angular relationship between the line-of-sight vector to any point in the scene to be imaged and the undesired motion vector appears as phase modulation of the radar echo when viewed at the radar receiver. Spatially varying phase errors, also dependent on the motion of the radar, occur because the effect is not constant for all locations in the scene.

To achieve finer resolution image processing, the signal processing burden must increase at least as rapidly as the inverse of the resolution squared, assuming that the image area is constant and the X and Y dimensional resolution change at the same rate. Thus, it appears that the requirements for both a real-time, imaging SAR, and fine resolution are in conflict. For this reason, radar systems which efficiently utilize computing devices are particularly important to advancing the state-of-the art in real-time SAR.

Synthetic aperture radars are known in the art. For example, much background is described in "Developments in Radar Imaging", *IEEE Transactions On Aerospace and Electronic Systems*, Volume AES-20, Number 4, July 1984.

U.S. Pat. No. 4,771,287 to Mims describes a method of correcting for focus errors and higher order errors that occur in radar processing. The system includes first and second stages for processing radar signals over a plurality of time samples. The first stage derives the signals at each time sample and forms a set of complex signals of point-like scatterers to form a time history. Focusing errors are corrected by generating a set of correcting signals. The method, however, compensates for phase errors common to range and azimuth locations within the imaged area, but cannot compensate for phase errors that vary as a function of location.

U.S. Pat. No. 4,758,838 to Maeda et al. describes a method of reconstructing original images from synthetic aperture radar image data. In order to speed up the reconstruction of the original image the process for generating a point image pattern and the Fast Fourier Transformation process are carried out once for every certain number of lines. Positional displacement is corrected by multiplying a phase rotation factor by the product of the Fourier image pattern and one line of the image data. The method uses range compression before azimuth compression. However, the method does not use two stages of azimuth compression which implements a subaperture approach.

U.S. Pat. No. 4,034,370 to Mims describes a method using two stage azimuth processing with range migration compensation being processed after range compression. The method does not combine initial stage azimuth filtering with linear-FM transmitter pulse processing to implement a range-migration correction with a phase rotation.

The prior art processing schemes require inefficient interpolation to compensate for range migration. Moreover, prior art radar architectures suffer from unduly large computational burden and memory requirements of the signal processor by not correcting the received radar phase for undesirable, motion-induced, errors using phase rotations in the local oscillator and sampling rate changes in the A/D converter.

Prior art radar architectures calculate in general purpose computers the time-varying coefficient vectors which are needed in the signal processor and do not synthesize these vectors with digital hardware. Note that range and coarse-resolution azimuth positions are known before the final processing stage, so that some spatially dependent phase errors that limit other techniques such as polar format processing are eliminated.

It is thus an object of the present invention to account for spatially varying effects of motion induced phase errors to achieve high image quality over large scene areas. This object is achieved in the present invention by, inter alia, correcting the radar phase for undesirable, motion-induced, errors using phase rotations in the transmitter, receiver, and signal processor and sampling rate changes in the A/D converter.

It is another object of the present invention to provide a radar and method for imaging that can be efficiently realized in digital hardware.

It is yet another object of the present invention to provide an apparatus and method for radar imaging which implements the method with signal processing operations.

It is yet another object of the present invention to minimize the computational burden and memory requirements of signal processing equipment.

It is yet another object of the present invention to organize processing requirements so that slow time varying coefficient vectors may be produced in general purpose computers and rapidly time varying coefficient vectors may be synthesized in hardware synthesizers.

It is thus an object of the invention to improve image quality at fine resolution of synthetic aperture radar which is degraded because the relative range of near and far images of a scene changes with motion of the radar. The radar herein is designed to change the radar center frequency, $f_o$, and either the signal sampling rate or the chirp rate based on actual radar motion using a digitally-controlled waveform synthesizer. A further advantage is that this improved image quality can be accomplished in a real-time system without adding to the burden of the radar's signal processor.

It is a further object of the invention to obtain fine resolution with minimal memory requirements. Because of the filtering operation at coarse resolution processing, only $A<M$ coarse-resolution azimuth bins need to be saved, thus achieving the reduction in real-time memory. Moreover, some of the signal processing operations are realized by varying the radar center frequency and either the chirp rate or the A/D sample rate. This process reduces memory requirements.

It is yet another object of the invention to achieve a synthetic aperture radar compensating for motion through range cells. This object is achieved when the spectrum of the signal in each subaperture is shifted by an amount that is proportional to the azimuth bin number of that column.

It is yet another object of the invention to allow for real-time processing concurrent with data collection. Certain functions, namely the coarse-resolution azimuth and the range processing, operate on one subaperture at a time wherein the data are reduced.

It is yet another object of the invention to remove the geometric distortion caused by range-doppler interaction. The feature of the invention which removes the geometric distortion is the use of the chirp-z transform as a last step in the processing. Moreover, a further advantage of this feature is that the invention produces an image with constant azimuth-sample spacing.

These and other objects are achieved with an imaging radar including a linear-FM type doppler radar for producing a received signal; a coarse-azimuth process for producing a plurality of subaperture arrays from the received signal, each subaperture array including a plurality of coarse-azimuth bins; a range process for producing a plurality of range bin vectors, each range bin vector having a plurality of range bins and being produced from a corresponding coarse-azimuth bin of the plurality of coarse-azimuth bins of each of the plurality of subaperture arrays according to the coarse-azimuth bin; and a fine-azimuth process for producing a radar image including a plurality of image lines, each image line being produced from a corresponding range bin of the plurality of range bins of each range bin vector of the plurality of range bin vectors.

These and other objects are achieved with a method of radar imaging including the steps of producing a received signal from a doppler radar having a linear-FM waveform; producing a plurality of subaperture arrays from the received signal, each subaperture array including a plurality of coarse-azimuth bins; producing a plurality of range bin vectors, each range bin vector having a plurality of range bins and being produced from a corresponding coarse-azimuth bin of the plurality of coarse-azimuth bins of each of the plurality of subaperture arrays according to the coarse-azimuth bin; and producing a radar image including a plurality of image lines, each image line being produced from a corresponding range bin of the plurality of range bins of each range bin vector of the plurality of range bin vectors.

BRIEF DESCRIPTION OF THE DRAWINGS

The invention will be described in detail in the following description of the preferred embodiments with reference to the following figures.

DESCRIPTION OF THE INVENTION

The imaging radar is a linear-FM, synthetic-aperture radar (SAR). Because of the challenging system requirements to achieve fine resolution, real-time image processing, and an ability to synthesize a large aperture, the invention embodies new SAR signal analysis processes using fast fourier transform (FFT) and vector-multiplication operations. These operations may be implemented with special-purpose hardware.

Figure 1:
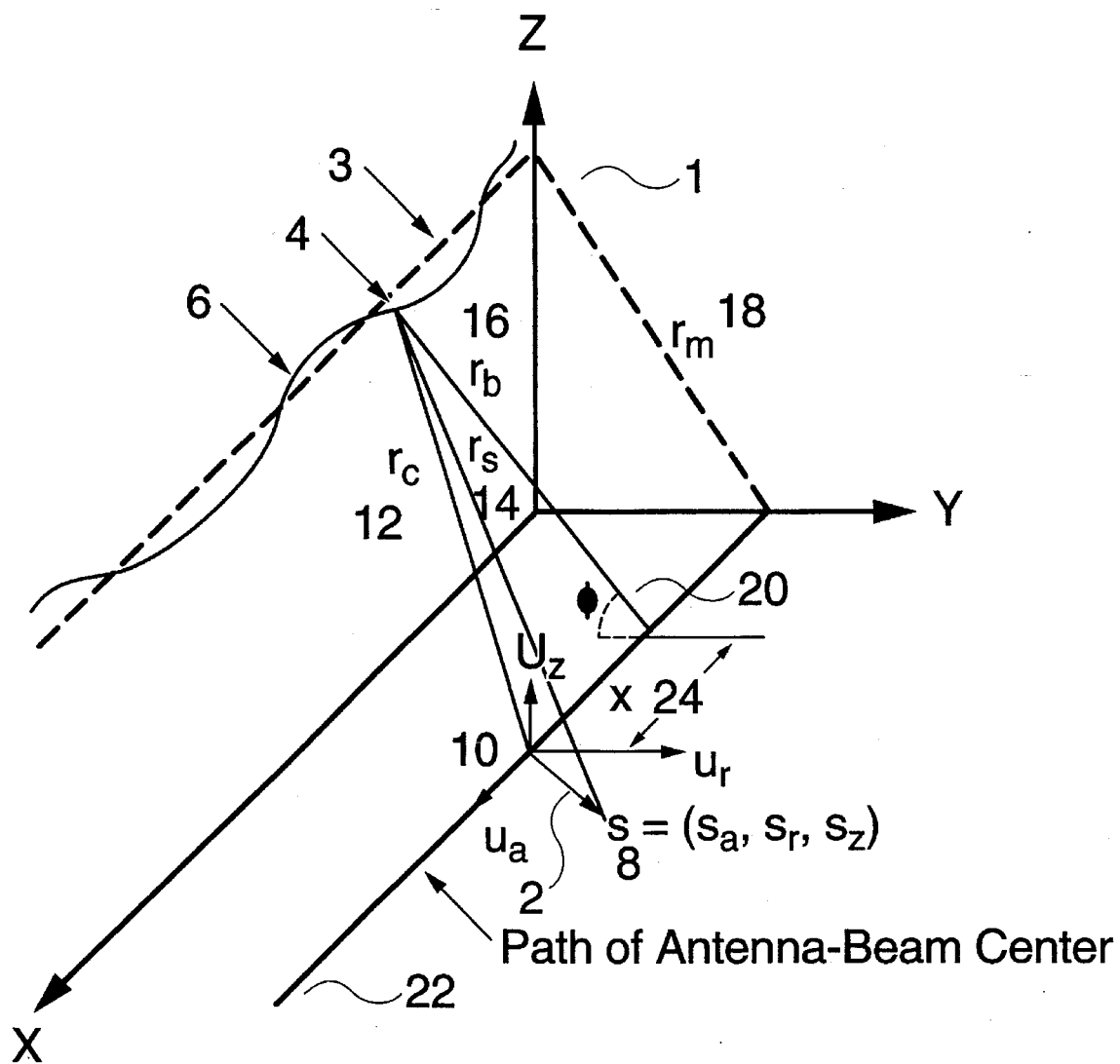
FIG. 1 is a drawing illustrating the geometry of the radar and a point scatterer.

With reference to FIG. 1 which describes the geometry of the SAR described herein and illustrates the first of an XYZ coordinate system 1 which is fixed with the XY plane tangent to the earth's surface and the X axis along a nominal motion path 3. The central reference point 10 is in the XY plane at a range $r_c$ 12 from the antenna phase center 4. A second coordinate system 2, defined by the orthonormal vectors $u_a$, $u_r$, and $u_z$, is centered at the central reference point 10, with $u_z$ parallel to the Z axis. The coordinates of the point scatterer 8, $\mathbf{s}=(s_a, s_r, s_z)$, are expressed in the second coordinate system 2. The range from point scatterer $\mathbf{s}$ 8 to the antenna phase center 4 is $r_s$ 14. For broadside imaging $u_a$ is parallel to the X axis. The variables $r_s$ and $r_c$ are time functions, and $\mathbf{s}$ is a constant.

Other geometric variables in FIG. 1 describe motion compensation. During motion, the center of the antenna beam on the ground moves along a straight line 22 in the XY plane parallel to the X axis wherein the variable x 24 is the distance along the X axis from the central reference point 10 to the beam center. The velocity of the beam center along this line is $V_x$. At the center of an aperture, x=0. For the situation in FIG. 1, x is negative. Finally, the line of sight from the antenna phase center 4 to the beam center on the ground makes an angle φ 20 with the XY plane and has length $r_b$ 16. The variable $r_b$ 16 and φ 20 are functions of $V_y$ and $V_z$, the Y and Z components of the antenna velocity. If the radar traveled exactly along the nominal motion path 3, then φ 20 and $r_b$ 16 would be constant, and $r_b$ 16 would equal the nominal range $r_m$ 18, but the radar travels along the actual motion path 6. If $r_{sc}$ is defined as the differential slant range, $r_{sc}=r_s-r_c$ then the range to the point $\mathbf{s}$ can be written as:

$$r_s = r_{sc} + r_b + x^2/(2r_b) \qquad (1)$$

where the last two terms are from the power series for $r_c$.

Figure 2:
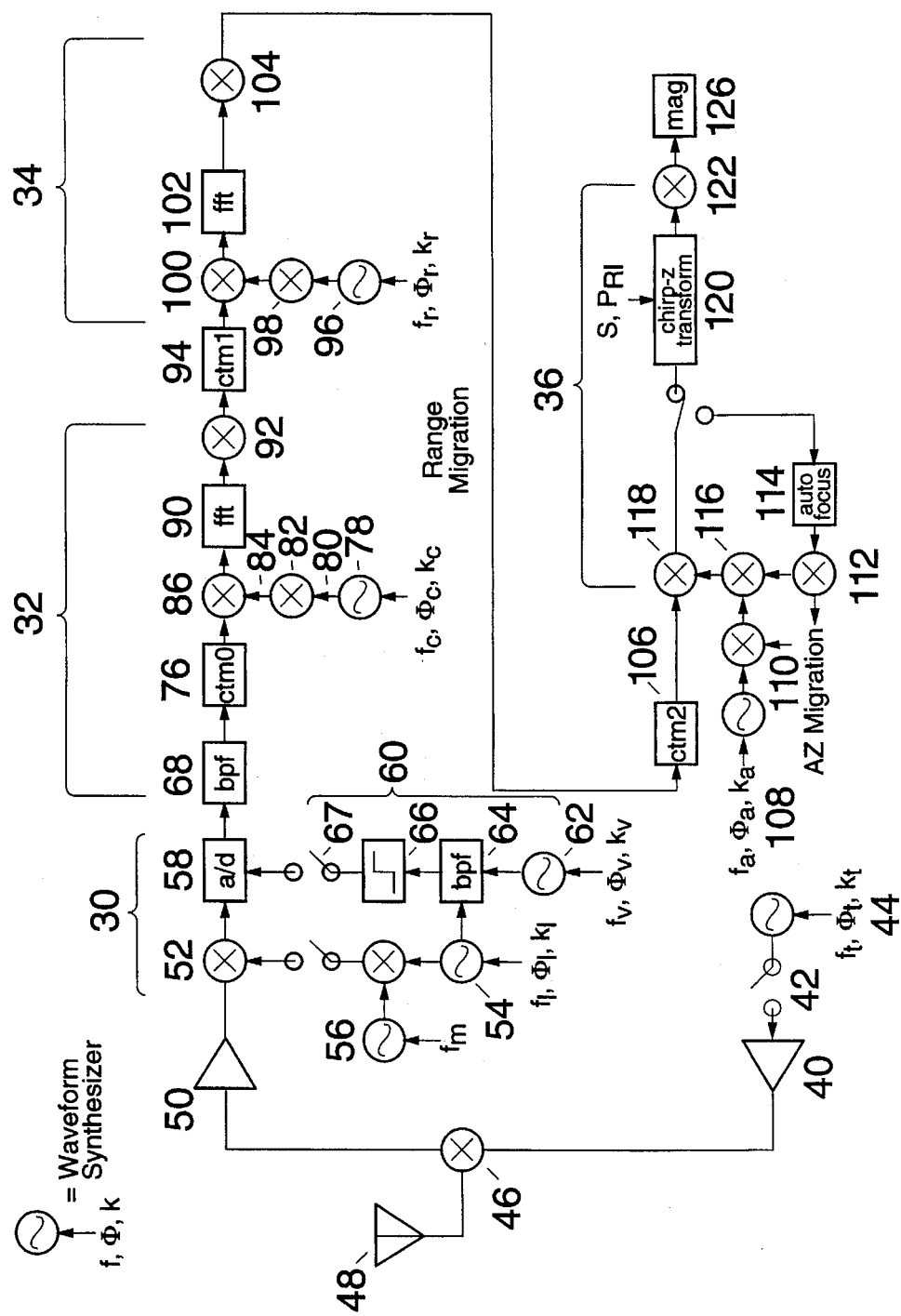
FIG. 2 is a functional block diagram of the synthetic aperture radar of the invention.

Given the geometry of the path of the motion of the radar and the scene to be imaged, the basic approach of the SAR invention is summarized in the functional block diagram of FIG. 2.

The purpose of motion compensation is to keep the radar returns from various scatterers in fixed range-doppler resolution cell during a coherent processing interval. So to start, motion compensation can be divided into two parts. First, the radar-return signals are adjusted so the range and doppler frequency corresponding to the central reference point (10 in FIG. 1) in the scene are constant, see block 30 in FIG. 2. For signals from scatterers sufficiently near the central reference point (10 in FIG. 1), this adjustment holds the range and doppler-frequency variations to a fraction of a resolution cell, and no other compensation is needed.

But for imaging a large scene at fine resolutions, the signals from scatterers farther away from the central reference point (10 in FIG. 1) have range and doppler-frequency variations of several resolution cells during a coherent processing interval. Thus, the second aspect of motion compensation of the invention to achieve fine-resolution image of a large scene is the need to correct for motion through resolution cells. The imaging radar described herein employs an overlapped subaperture processing approach to compensate for motion through resolution cells in a novel way. Motion through range cells is largely a function of range rate or doppler frequency. An initial coarse-resolution azimuth-processing stage 32 sorts dechirped baseband signals into doppler-frequency bins corresponding to a coarse-azimuth position. Next, the signal in each bin is corrected for range variations 34. Because the radar transmits a linear-FM pulse, the correction is a frequency shift in the dechirped baseband signal that is proportional to the doppler bin number implemented by a simple vector multiplication compatible with signal processing equipment. The range-stabilized dechirped baseband signals are Fourier transformed to obtain fine resolution in range.

The remaining motion is through doppler cells and is a function of both the range and azimuth coordinates of a scatterer within a scene to be imaged. The azimuth dependence is weak, so the process corrects for motion through doppler cells using fine-resolution range and coarse-resolution azimuth information as another vector multiplication. Some spatially dependent phase errors are eliminated because the range and coarse-resolution azimuth positions are known before the final processing stage.

The doppler-stabilized signals are then Fourier transformed to obtain fine resolution in azimuth, see block 36 of FIG. 2. The bandwidth and frequency-sample spacing in this transform are varied as functions of range to hold the azimuth width and sample spacing constant in the output image.

The first stages of the SAR image processing illustrated in FIG. 2 begins with the transmitted signal from transmitter 40. The transmitter 40 of the invention generates a linear-FM waveform with a transmitter starting frequency $f_t$, a center frequency $f_o$, starting phase $\phi_t$, and chirp rate $\gamma_t$. Digitally-controlled waveform synthesizer 44 permits the transmitter starting frequency $f_t$, starting phase $\phi_t$, and chirp rate $\gamma_t$ to be changed on a pulse-to-pulse basis based on actual radar motion. These radar pulses are transmitted at a pulse repetition frequency PRF. The achievable range resolution of a linear-FM waveform is inversely proportional to the total transmitted bandwidth; for example, BW≈150 MHz/$\rho_r$ where $\rho_r$ is the desired range resolution in meters. If the total transmitted bandwidth is $\tau_t \cdot \gamma_t$, then $\gamma_t$=150 MHz/($\tau_t \cdot \rho_r$). The transmitted waveform is pulse modulated with pulse width $\tau_t$ by an RF switch 42 and amplified by the transmitter 40. The amplified transmitter signal is coupled to antenna 48 through a circulator 46.

The energy radiated by the antenna 48 is then propagated to the scene in the field of view of the antenna 48 and scattered by the objects in the field of view. The intensity of the back scattered energy is proportional to the radar cross section of the objects the wave strikes. The backscattered energy propagates back to the antenna 48 where it is received and coupled to receiver 50 through the circulator 46.

At the receiver 50, each pulse is dechirped, mixed to baseband, and sampled to produce a complex dechirped baseband signal. More specifically, the receiver 50 amplifies the signal, and mixes it in mixer 52 with receiver local oscillator 54 which has a starting frequency $f_1$, starting phase $\phi_1$, and chirp rate $\gamma_t$. The receiver local oscillator 54 is pulse modulated with pulse width $\tau_1$. The receiver local-oscillator pulse width is greater than the transmitter pulse width by the difference in the time it takes an electromagnetic wave to propagate from the radar to the near side of the scene and back to the antenna and the time of propagation from the antenna to the far side of the scene and back to the antenna. The local oscillator chirp rate $\gamma_t$ is set equal to the transmitter chirp rate and both shall be herein represented as $\gamma$. The local oscillator starting frequency and starting phase of the receiver local oscillator 54 are adjusted on a pulse-to-pulse basis depending upon actual motion of the radar. When coarse-resolution changes in the radar frequency are needed, the local oscillator frequency $f_1$ of oscillator 54 is changed directly; however, second oscillator 56 with very fine-resolution control also generates a frequency translation, $f_m$, determined by the motion of the radar.

The mixing operation in the mixer 52 is a quadrature mixing operation. In-phase, I, and quadrature, Q, components of the receiver signal are produced by mixing the receiver signal with local oscillator signals separated ninety degrees in phase. A pair of analog-to-digital (A/D) converters 58 quantize the data for use by a digital signal processor. The sampling frequency $f_v$ and starting time of the dechirped baseband samples are modified on a pulse-to-pulse basis based on measured radar motion. Samples of the dechirped baseband pulses are collected for a length of time $\tau_v$, where typically, $\tau_t \leq \tau_v \leq \tau_1$.

A novel circuit 60 using digital waveform synthesizer 62, bandpass filter 64, one-bit quantizer 66, and switch 67 permits the sampling location and the A/D sampling frequency to be controlled with extremely fine resolution without using a very high frequency oscillator. The clock edges from this circuit can be far more precisely controlled than other methods within the state-of-the art. This circuit 60 generates a burst of clock edges to cause the A/D to sample the dechirped baseband signal.

Inputs to the circuit are the chirp rate of the A/D strobe signal $\gamma_v$, starting frequency $f_v$ determined by the desired initial sampling frequency, starting phase $\phi_v$ determined by the location of the A/D samples, the number of samples of the dechirped baseband signal to be taken by the A/D, F, and a delay determined by the delay from the start of the local oscillator waveform from 54 until the switch 67 is closed.

Digital waveform synthesizer 62 is triggered at the same time as the local oscillator waveform synthesizer 54. Bandpass filter 64 is a combination of high-pass filter and a low-pass filter which performs the function of interpolating between the discrete voltage amplitudes from the digital waveform synthesizer so that zero crossings occur with a period equal to the inverse of the frequency synthesized by the digital waveform synthesizer. If the interpolation filter is not used, the zero crossings occur at an integer multiple of the period at which the digital waveform synthesizer 62 is clocked rather than with a period which is inversely proportional to the frequency being synthesized by the digital waveform synthesizer. The one-bit quantizer 66 is a zero-crossing detector which converts the interpolated waveform from the bandpass filter 64 into a square wave. The switch 67 is closed just prior to the rising edge corresponding to the desired time of the first sample of the dechirped baseband signal and held closed until F samples have been taken. The switch 67 is not closed until the quantizer output 66 is in an "off" state so that an extraneous clock is not generated at switch closing.

This circuit 60 provides control of three fundamental parameters of the A/D clock signal: (1) position of the rising A/D strobes, (2) period of the A/D strobes, and (3) rate of change in frequency (chirp rate) of the A/D strobes.

The location of the first A/D strobe may be controlled to a small fraction of the period of the A/D strobes by adjusting the starting phase $\phi_v$ and the delay until the switch 67 is closed. For current digital waveform synthesizer technology the starting phase is settable to within 1 part in 4096 for the period of the signal being synthesized. If 100 MHz A/D strobes are being generated this means that the starting location has a relative accuracy of 2.4 ps using the starting phase. To achieve similar performance using typical digital counter circuit technology would require a counter circuit to function at an input clock frequency of more than 400 GHz. This requirement exceeds today's technology by approximately 2 to 3 orders of magnitude. The precision with which the A/D strobe location may be set is a unique feature of this A/D strobe generator circuit topology.

Additionally the period of the A/D strobes may be precisely controlled by setting the frequency $f_v$. Current digital waveform synthesizer technology provides from 24 to 32 bits of precision in the value of $f_v$ at clock frequencies of greater than 400 MHz. If a 10 ns A/D strobe period (100 MHz frequency) is desired, 24 bits of precision is assumed, and the input clock frequency for the digital waveform synthesizer is 400 MHz, the A/D strobe frequency may be set to a precision of approximately 23 Hz. The two adjacent values of the A/D strobe periods (1/100 MHz and 1/100.000023 MHz) would therefore be separated by approximately 2.4 fs which is a smaller period step size by several orders of magnitude than other methods for generating A/D strobe signals for sampling deramped baseband signals. If the 400 MHz clock frequency is used directly in a divide-by-N circuit, the next shorter period than 10 ns is 7.5 ns which is a step size of 2.5 ns, 6 orders of magnitude larger than possible with the strobe generator circuit 60.

Figure 3:
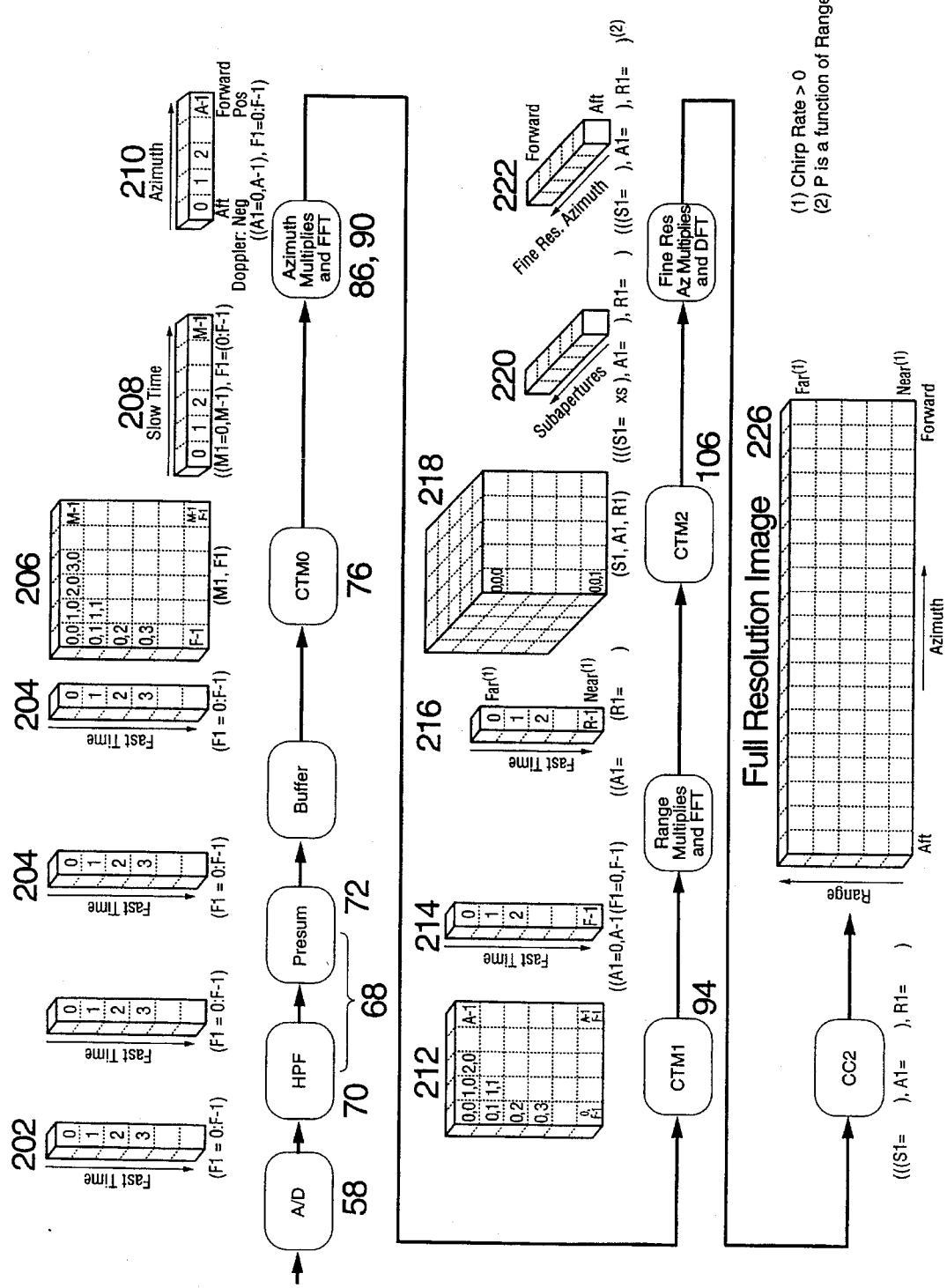
FIG. 3 is a signal processing flow chart of the invention.

Returning now to the discussion of SAR, the functional block diagram of the invention will be read in conjunction with the data flow diagram of FIG. 3. The AC-coupled analog to digital A/D converters 58 in principal sample the received signal from mixer 52 shown to produce received vector 202 shown in FIG. 3. Conceptually, it is useful to think that coarse-resolution azimuth processing 32 begins with bandpass filtering 68. The bandpass filtering 68 is implemented first as a high-pass filter 60 and a presummer 62 wherein the low-pass filters in embodied in dedicated special purpose hardware that executes operations as the radar samples are collected. Gallium arsenide integrated circuits have been developed for each of these functions.

The high-pass filter 70 of the bandpass filter 68 removes the non-zero DC-bias resulting from the drift of the A/D input. The time constant of the high-pass filter 70 is many times longer than a synthetic aperture of data to avoid removing any of the radar data with the high-pass filter 70.

The presummer 72 reduces the data rate for the signal processor by a factor of $N_p$ where $N_p$ is the number of dechirped baseband pulses integrated into a sample. This is also described as a point-by-point accumulation of the data in $N_p$ data vectors, each of length F where F is the number of A/D samples in each pulse and is a function of the time duration of the dechirped baseband pulse and the sample rate. This feature is extremely advantageous in real-time signal processing. This presummer 72 is actually many filters operating in parallel, one for each dechirped baseband sample output from the A/D converter 58 and passed through the high pass filter 70. While the folding frequency of this filter, in the azimuth dimension, is located at approximately the 4 dB point on the filter rejection, the azimuth beamwidth of the radar antenna and the output sampling rate of this filter can be chosen to limit the amplitude of aliased energy. After $N_p$ vectors have been accumulated, the resulting vector 204 is sent to the remainder of the radar processor.

To reduce the amount of the dechirped baseband and doppler bandwidth required, the radar removes the range and doppler-frequency components contained within the first $r_b$ term in Equation (1). This is accomplished by changing, as functions of $r_b$, the local oscillator phase and local oscillator starting frequency $f_1$.

Let $x_v(FI,n)$ be the $FI^{th}$ time sample of the $n^{th}$ dechirped baseband pulse at the presummer output, i.e., the $FI^{th}$ element of the received vector 204 in FIG. 3, where FI=0, 1, ..., F-1, and n=0, 1, ..., $N_a$-1, where $N_a$ is determined by, inter alia, the azimuth resolution. Then $$x_v(FI,n) = A_R \exp\{-j(4\pi/c)r_{sc}[\gamma T_s(FI - F/2) + f_o]\} \cdot \quad (2)$$

$$\exp\{-j(4\pi/c)[x^2/(2r_b)][\gamma T_s(FI - F/2) + f_o]\} \cdot$$

$$\exp[j(4\pi\gamma/c^2)(r_s - r_m)^2],$$

where $A_R$ is an amplitude factor, c is the speed of light, and $T_s$ is the A/D sample period, $\gamma$ is the chirp rate, and $f_o$ is the transmitter center frequency. F is the total number of samples in each dechirped baseband pulse and x (24 in FIG. 1) is the distance along the X axis from central reference point (10 in FIG. 1) to the beam center. The constant $r_m$ is set by the time position of the local oscillator pulse, and is taken here to be the nominal range (18 in FIG. 1). Equation (2) shows that varying $f_o$ and either $\gamma$ or $T_s$ as functions of the out-of-plane, in other words, the actual motion applies a scale factor to $r_{sc}$ and removes some motion-induced errors. In one approach, $T_s$ and $f_o$ can be varied as functions of $\cos\phi$. In view of the radar equation, the variable $A_R$ depends on both $r_s$ and the position of s in the antenna pattern.

Given the $x_v(FI,n)$ values, the task of signal-processing is to estimate the position and relative reflectivity of the point scatterers from the expression on the first line of Equation (2). The other two expressions are extraneous terms that are removed at suitable stages. The expression on the second line contains the part of central reference point motion that is quadratic in x. For a coarse-resolution SAR, the dependence of this term on FI is negligible, and it reduces to the usual azimuth chirp. There are two reasons why the $x^2/(2r_b)$ factor is not included in the function that controls the receiver dechirp pulse which would eliminate the whole central reference point-motion term at one time. First, it is sometimes useful to record the dechirped baseband signal continually and process it off-line with assorted central reference points and resolutions. But calculation of x at the time a return pulse arrives supposes that the central reference point and the azimuth resolution are determined before data collection begins. And the invention herein accommodates off-line processing. Second, and more importantly, the radar may have multiple range channels, each with the same azimuth resolution. This will require different central reference point locations and aperture lengths in the separate channels. The expression on the third line of Equation (2) is negligible in the case requiring coarse-resolution in azimuth. If the radar varies the time position of the dechirp signal as a function of $r_c$, then the $r_m$ is replaced with $r_c$ and the term can be omitted if |s| is not too large. Neither of these conditions are applicable.

Motion through resolution cells can be significant over the integration time required to obtain fine resolution in azimuth. The invention handles this problem by dividing the dechirped baseband data collected for the whole synthetic aperture into smaller, overlapping subapertures in which the motion through resolution cells is insignificant within a subaperture.

Figure 4:
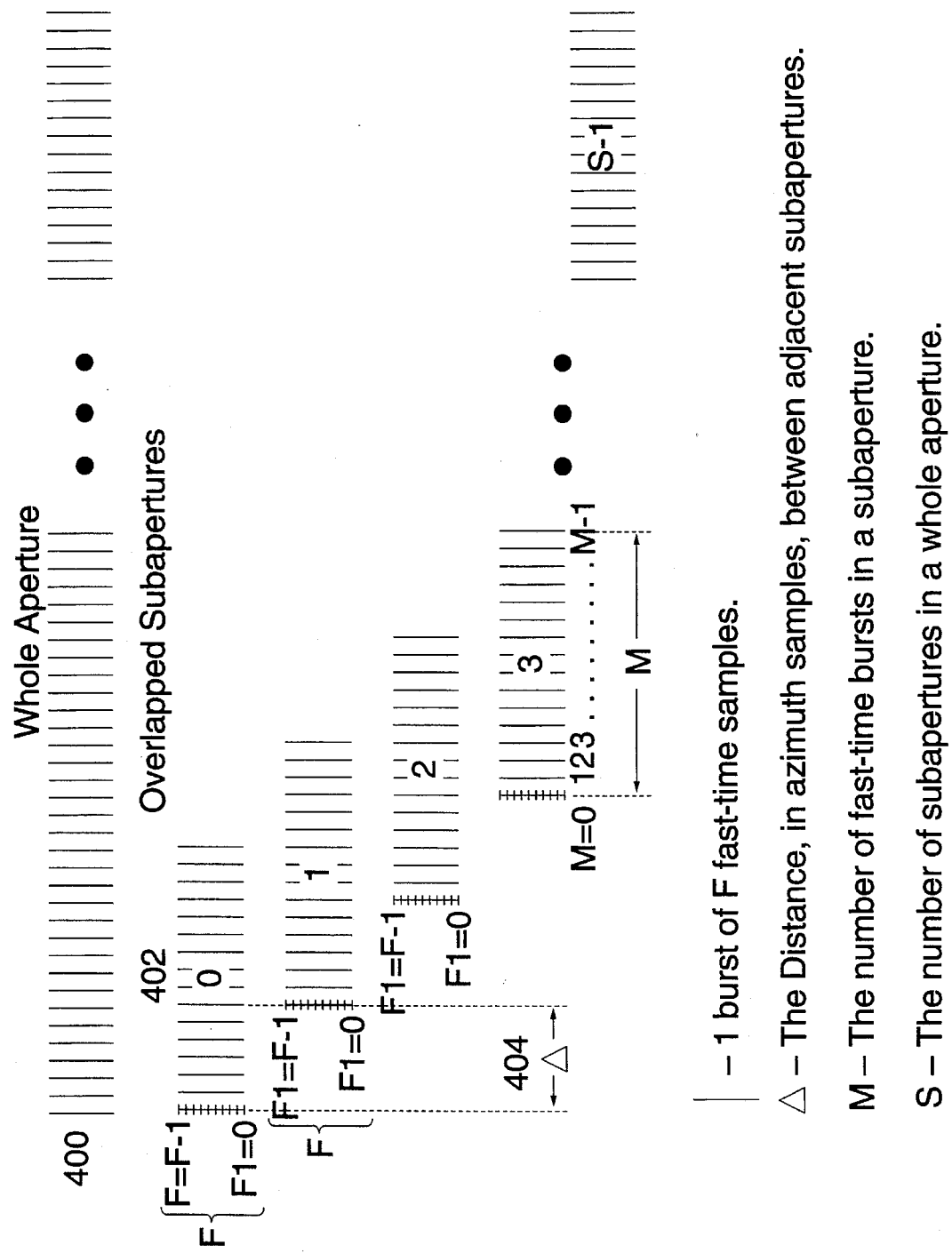
FIG. 4 is a subaperture formation timing diagram.

FIG. 4 shows how the subapertures are defined. Each vertical line 400 represents a single dechirped baseband pulse, i.e., it represents $x_v(FI,n)$ for all FI and a fixed n. Recall that for $x_v(FI,n)$, $FI^{th}$ represents a particular time sample of the $n^{th}$ dechirped baseband pulse, where FI=0, 1, ..., F-1, and n=0, 1, ..., $N_a$-1. The whole F×$N_a$ phase-history array is divided into S subapertures 402. A subaperture array 402 is an F×M complex matrix indexed by the integer SI, where $0 \leq SI \leq S-1$. Within a subaperture 402, the dechirped baseband pulses are indexed by another integer m, where $0 \leq m \leq M-1$. The delay from the beginning of one subaperture to the next is $\Delta$ 404. $\Delta$ 404 is chosen to constrain the azimuth sidelobes far away from the main lobe below system requirements. From FIG. 4, the number of azimuth samples is related to M and $\Delta$ by $$N_a = (S-1)\Delta + M. \tag{3}$$

Because the data are initially processed by subapertures, it is convenient to define a new notation for the dechirped baseband samples. Let $$x_v(FI, m, SI) = x_v(FI, n) \tag{4}$$

for $n = SI\Delta + m$. Also, whenever an index is replaced by a ·, the notation denotes the array of data elements corresponding to all values of the missing index. For example, $x_v(\cdot, m, SI)$ is the F×1 vector of dechirped baseband samples for the $m^{th}$ pulse in the $SI^{th}$ subaperture. Similarly, $x_v(\cdot, \cdot, SI)$ is the F×M matrix of dechirped baseband samples for the $SI^{th}$ subaperture.

The differential slant range, cf with Equation (1), between the central reference point and s evaluated at the transmission time of the $n^{th}$ pulse, can be written as $$r_{sc} = r_o - (\lambda/2)[n - (N_a/2)]f_D + \eta_n, \tag{5}$$

where $r_o$ is the slant range and $f_D$ the normalized doppler frequency, both evaluated at the center of the synthetic aperture, and $\eta_n$ is an expression that accounts for higher-order variations in $r_{sc}$. Equations for the quantities $r_o$ and $f_D$ are given in the sections on the range process and coarse-azimuth process, respectively.

The function $\eta_n$ varies slowly with n, so for $n = m + SI\Delta$, it can be approximated by $\eta_{SI\Delta}$, its value at the center of subaperture. By using (5), and making several other approximations, the expression for the dechirped baseband samples reduces to $$x_v(FI, m, SI) = A_R \exp\{-j(4\pi\gamma T_s r_o/c)[FI - (F/2)]\} \cdot \tag{6}$$

$$\exp\{j2\pi f_D(m + SI\Delta)\} \cdot F_{ca}*(m, SI) F_r*(FI, SI) \cdot$$

$$\exp\{j(2\pi\gamma\lambda\Delta T_s/c)[FI - (F/2)][SI - (S-1)/2]f_D\} \cdot \exp(-j2\pi\xi_{SI}).$$

This equation describes the basic form of the processes of the invention. Each term in Equation (6) is operated on by a specific process of the invention. The complex exponential on the first line is the dechirped baseband signal that would result if the radar were stationary. In this case, the range $r_o$ could be resolved through a simple FFT operation. The expression on the second line is the doppler signal resulting from a linear change in $r_{sc}$. The product on line three is just the central reference point-motion term from line 2 of Equation (2) and is further discussed with reference to Equations 8 and 14. Here it is factored into separate azimuth and range components.

For some combinations of resolution and scene size, only the first three lines of Equation (6) are required to describe the dechirped baseband signal. In such a case, processing reduces to three simple steps. First, the dechirped baseband data are multiplied by the conjugate of the expression on line three. This holds the slant range and doppler frequency of the signal from the central reference point at the origin in a range-doppler plane. Second, the data are windowed and transformed with respect to FI to resolve $r_o$. And third, the data are windowed and transformed with respect to n $(=m + SI\Delta)$ to resolve $f_D$. The order of the last two steps is unimportant. For fine resolution and large scene size, the terms on lines four and five of Equation (6) are not negligible. The expression on line four describes the motion through range cells. Only the motion that is linear in SI, known as range walk, is included. Because the expression does not depend on m, range walk during a subaperture is neglected. The expression on line five describes the motion through doppler cells. The function $\xi_{SI}$ is a combination of $\eta_{SI\Delta}$ from Equation (5) and the expression from the last line of Equation (2). It depends on the coordinates of s as well as the exact trajectory of the antenna phase center.

At the next stage of coarse-resolution azimuth processing, the subapertures are processed to obtain coarse resolution in doppler frequency and hence, in azimuth position. The columns of a data block are sorted into doppler frequency bins. In view of Equation (6), this corresponds to sorting by the amount of range walk. The dechirped baseband pulses out of the bandpass filter 68 read into the first corner-turning memory CTM0 76 in FIGS. 2 and 3. Each dechirped baseband pulse, e.g., each received vector 204 (FIG. 3) corresponds to an F×1 column vector $x_v(\bullet, m, SI)$. In CTM0 76, sequences of M column vectors 208 are arranged into F×M matrices called subaperture arrays 206. The coarse-resolution azimuth process operates on one subaperture at a time. During the length of a synthetic aperture, a total of S subapertures are formed, as shown with respect to FIG. 4. The subapertures are overlapped as shown in FIG. 4.

After an F×M subaperture 206 is formed, the data are read out of CTM0 as a 1×M row vectors 208. For the $SI^{th}$ subaperture, the input to this process consists of a sequence of 1×M vectors 208, $x_v(FI, \bullet, SI)$ for $0 \leq FI \leq F-1$, read from CTM0 76. The first operation on the vectors 208 read from CTM0 is multiplication by $w(\bullet)$ 82 and $F_{ca}(\bullet, SI)$. The second vector, $F_{ca}(\bullet, SI)$, is called the coarse-resolution azimuth focus vector and is a synthesized waveform 80 having a starting frequency $f_c$, starting phase $\phi_c$, and chirp rate $\gamma_c$. Let $w(m)$ be the window function, $0 \leq m \leq M-1$, and let $w(\bullet)$ be the corresponding 1×M vector. The 1×M vector whose $m^{th}$ element is $w(m) x_v(FI, m, SI)$ is represented as the product $w(\bullet).*x_v(FI, \bullet, SI)$ wherein the symbol .* denotes element-by-element multiplication of two vectors. Also each row vector 208 is multiplied at 86 by a coarse-resolution azimuth focus vector that stabilizes the doppler frequency of a reference point at the center of the scene on the ground. The coarse-resolution azimuth focus vector is produced in multiplier 84 and the synthesized waveform 80 is produced in waveform synthesizer 78. This operation does not stabilize points that are far away from the reference point. Such points are stabilized at the fine-resolution step.

The radar may use a variable pulse repetition frequency PRF to transmit pulses at equal-distance increments $d_x$ along the X axis, so the position x in (2) is $$x = \{(m - M/2) + [SI - (S-1)/2]\Delta\}d_x, \tag{7}$$

and the focus vector has components $$F_{ca}(m, SI) = \exp[j(2\pi/\lambda)(x^2/r_b)], \tag{8}$$

where $r_b$ is evaluated at the center time of the $SI^{th}$ subaperture. Since $F_{ca}(\bullet, SI)$ does not depend on FI, the same vector can be used for all the rows in a subaperture. Also, because of the equal x increments, the focus vector can be synthesized with a hardware chirp generator as the data are read from CTM0. Both these observations aid the implementation process in a real-time processor. In situations, however, when the process described herein is used off-line, consideration must be given to the facts that the factored central reference point-motion expression is an approximation. In certain situations, however, it is desirable to vary the PRF as a function of the squint angle to the central reference point. This option is further discussed later with respect to other embodiments of the invention.

Next, the vector 208

$$w(\bullet).*F_{ca}(\bullet,SI).*x_v(FI,\bullet,SI) \qquad (9)$$

$0 \leq F \leq F-1$ is transformed using a length-M Fast Fourier Transform (FFT) 90 to yield the vector. The components of the resulting 1×M vectors are indexed by frequency bin having width 1/M in normalized frequency units. The resulting vector 210 is ordered by coarse azimuth position into coarse-azimuth bins. Because the azimuth sample rate is chosen to oversample the doppler spectrum from the scene of interest, only A<M coarse-resolution azimuth bins are saved. This azimuth filtering operation reduces memory requirements of the hardware of the system. To determine A, it is necessary to estimate the maximum doppler bandwidth. For a scatterer at $\mathbf{s}=(s_a,s_r,0)$, the normalized doppler frequency is $$f_D=[2d_x/(\lambda r_b)]\{s_a[1-s_r\cos\phi/r_b)]\}, \qquad (10)$$

where $r_b$, $\phi$, and the velocity components are evaluated at the center time of the aperture. For real-time operation, the maximum doppler frequency is estimated from Equation (10) based on the scene size. The bandwidth of the normalized doppler spectrum is no greater than A/M, where A is the smallest integer satisfying $$A \geq 2M \max|f_D|. \qquad (11)$$

For some combinations of parameters, it is necessary to shift the spectrum to make it fit in A bins. This is accomplished by including a frequency shift when the input vectors are multiplied by $w(\bullet)$. Now AI is the frequency-bin index that replaces m after the FFT, and let W(f) be the discrete Fourier transform (DFT) of w(m). An output-vector from the coarse-resolution stage, i.e., the output row vector 208a, denoted by $x_c(AI,\bullet,SI)$, has components $$x_c(FI,AI,SI) = A_C\exp\{-j(4\pi\gamma T_s r_o/c)[FI - (F/2)]\} \cdot \qquad (12)$$
$$F_r^*(FI,SI)\exp\{j(2\pi\gamma\lambda\Delta T_s/c)[FI-(F/2)][SI-(S-1)/2]f_D\} \cdot$$
$$W[(AI/M) - f_D]\exp(j2\pi f_D SI\Delta)\exp(-j2\pi\xi_{SI}),$$

where $0 \leq AI \leq AI-1$ and a constant-phase term is omitted. The azimuth sample index in SI instead of N indicates that the signal in each coarse resolution azimuth bin is down-sampled by a factor of $\Delta$.

One of the approximations implicit in Equation (12) is that motion through coarse-resolution doppler cells is neglected. A more detailed analysis treats the $f_D$ in the argument of W [ ] as a function of SI. The analysis has shown that motion through half a coarse cell during an aperture has no important effect on the point-scatterer response function. Current radar and scene-size parameters restrict the maximum motion to this range, so the approximation is justified.

The columns of the matrix $x_c(\bullet,\bullet,SI)$ contain linear combinations of the dechirped baseband pulses collected during the $SI^{th}$ subaperture. Because of the window factor, $W[(AI/M)-f_D]$, a dechirped baseband-signal component with doppler frequency $f_D$ will have maximum amplitude in the column with AI/M closest to $F_D$. In this sense, the dechirped baseband returns are sorted by doppler frequency into the columns indexed by AI.

Because the bin width in frequency is 1/M, it follows from Equation (10) that the coarse-resolution sample spacing in azimuth, for $s_r=s_z=0$ is $$\delta_{ca}=\lambda r_b/(2Md_x). \qquad (13)$$

The amplitude factor $A_R$ in Equation (6) contains roll-off effects from the antenna gain and presummer. So at this point in the process, it is convenient to apply corrections at 92 for the azimuth antenna-pattern and the presummer frequency response. To accomplish this, each FFT-output vector is multiplied by a correction vector at 92 to produce a new amplitude factor $A_C$, that is independent of azimuth position.

Then the result, the output row vector 210 is written into the second corner-turning memory CTM1 94 which forms an F×A matrix 212. For range processing, F×1 column vectors 214 are read from CTM1 94. The signal in a column is the superposition of returns from points in one coarse-resolution azimuth bin and all ranges in the scene. In a linear-FM radar system, the frequency of the signal component from each point scatterer is proportional to its range. Thus to compensate for changes in range, the spectrum of the signal in each column is shifted.

There are two components of the required frequency shift. The first frequency shift at 98 stabilizes the central reference point in range and is applied equally to each vector in a subaperture. The expressions on line two of Equation (12) describe how the dechirped baseband frequency of the signal from a point scatterer varies during an aperture. The first expression, $F_r^*(FI,SI)$, represents the term of the central reference point range that is quadratic in x. Its effect is removed by multiplying each input vector by $F_r(\bullet,SI)$, where $$F_r(FI,SI)=\exp\{j2\pi x^2\gamma T_s[FI-(F/2)]/(cr_b)\}. \qquad (14)$$

In Equation (14), x and $r_b$ are evaluated at the center of the $SI^{th}$ subaperture. After multiplication by $F_r(\bullet,SI)$, the dechirped baseband frequency from a scatterer at the central reference point is zero. If only the first frequency shift is performed, the signals from points far away from the reference point will still move through range-resolution cells.

A second frequency-shift at 96 is necessary to correct for the remaining motion through range, range walk. The second expression on line two of Equation (12) describes the dechirped baseband-frequency variation that corresponds to range walk which is a function of $F_D$. For any column of $x_c(\bullet,\bullet,SI)$, the total range walk over an aperture is $(S-1)\Delta\lambda|f_D|/2$, which can be a number of range cells. By design, the doppler frequency $f_D$ is in one of the frequency bins $0 \leq AI \leq AI-1$. It is possible to remove most of the range walk as follows. Define a motion through range or range-walk correction vector $F_{rw}(\bullet,AI,SI)$ by $$F_{rw}(FI,AI,SI)=\exp\{-j2\pi[\gamma T_s\lambda\Delta AI/(cM)][SI-(S-1)/2][FI-(F/2)]\} \quad (15)$$

where FI=0, 1, . . . , F−1, and SI=0, 1, . . . , S−1, and AI is as above. Then for each AI, multiply $x_c(\bullet,AI,SI)$ by $F_{rw}(\bullet,AI,SI)$. In column AI, the residual range walk over an aperture is $$rw(AI)=(S-1)\Delta\lambda|f_D-(AI/M)|/2. \quad (16)$$

Let $AI_o$ be the bin where $f_D$ lies, that is, $|f_D-AI/M|$ is a minimum at $AI_o$. The effect of the range-walk correction is to decrease the range walk for the signal in bin $AI_o$ and to increase it for the signals in the other bins. If $f_D$ is in the center of bin $AI_o$, then $f_D=AI_o/M$, and the residual range walk is zero. In the worst case, $f_D$ is at the edge of the bin, and the residual range walk is $(S-1)\Delta\lambda/(4M)$. To avoid amplitude loss and spreading in the point-scatterer response function, $rw(AI_o)$ should be held to a maximum of about one range-resolution cell. Let $\rho_r$ be the range resolution cell size. By relating M to the coarse azimuth resolution $\rho_{ca}$, and $S\Delta$ to the fine azimuth resolution $\rho_a$, this constraint is:

$$\rho_r \geq (\lambda/4)(\rho_{ca}/\rho_a). \quad (17)$$

Because $\rho_r$ and $\rho_a$ are system parameters, the inequality is best thought of as a constraint on $\rho_{ca}$, which is the product of $\delta_{ca}$ given by Equation (13) and the coarse-resolution window bandwidth.

Thus, the spectrum of the signal in each column is shifted by an amount that is proportional to the azimuth bin number AI of that column, i.e., an azimuth position of a center of an azimuth bin vector. This simple vector multiplication which performs range frequency translation is a key operation in the invention and is unique to this radar. The frequency shifts are added together to arrive at the value of $f_r$.

A vector is then synthesized at 96 with frequency range translation $f_r$ and range translation starting phase $\phi_r$. The range translation chirp rate, $\gamma_r$, of this synthesizer is set to zero.

After multiplication by the two-motion compensation vectors, the resulting columns are multiplied by a range window $w_r(FI)$, 0 FI=0, 1, . . . , F−1 at 98. The resultant data vector 214 is then multiplied at 100 by a F×1 column vector from CTM1 and Fourier transformed at 102 to resolve $r_o$.

The input to the range FFT is $$w_r(\bullet).*F_r(\bullet,SI).*F_{rw}(\bullet,AI,FI).*x_c(\bullet,AI,SI). \quad (18)$$

If necessary, this vector can be zero filled to $F_{ft}$ elements, where $F_{ft}$ is a power of two. Then the sample spacing in range for the FFT-output vector is $$\gamma_r = c/(2\gamma T_s F_{ft}). \quad (19)$$

Assume that R output samples are saved; that these are indexed by RI where $0 \leq RI \leq R-1$; and that range bin RI corresponds to a slant range $r=-(RI-R/2)\delta_r$. At this point in the process, the data vectors are available as functions of slant range. The slant range $r_o$ that the radar measures is approximately $$r_o = s_r \cos\phi - s_z \sin\phi + [(s_r \sin\phi + s_z \cos\phi)^2 + s_a^2]/(2r_b) \quad (20)$$

where $\phi$ and $r_b$ are evaluated at the center of the aperture. The last expression in Equation (20) accounts for wavefront curvature which is a significant factor for fine resolution and large scene size.

Let $x_r(\bullet,AI,SI)$ denote the R×1 output vector from the range-processing stage. An element of this vector is $$x_r(RI,AI,SI)=A_o R(r-r_o) \cdot W[(AI/M)-f_D]\exp(j2\pi f_D SI\Delta) \exp(-j2\pi\xi_{SI}), \quad (21)$$

where R(r) is the DFT of $w_r(FI)$, and $A_o$ is the amplitude factor corrected for range-dependent variations. Because of the factor $R(r-r_o)$, the columns of the vector $x_r(\bullet,\bullet,SI)$ have fine resolution in range. Because of $W[(AI/M)-f_D]$, the rows have coarse resolution in azimuth. FIG. 8 is a diagram of the range-processing operations. The output R×1 column vectors have fine-resolution in range. Next, they are corrected at 104 for the elevation antenna gain pattern, range law path loss, and filter imperfections. The output vectors $x_r(\bullet,AI,SI)$ are written into CTM2 106.

The coarse-resolution azimuth process 32 and range process 34 are repeated as data are collected for each of the S subapertures. The operations up to this point can be performed in parallel with data collection, another advantage for real-time processing. Other subaperture techniques compensate for motion through range cells by interpolating and resampling signals that have already been range compressed.

The output matrices from range processing are arranged into an RAS array 218. This three-dimensional array is the input to the azimuth fine-resolution processing 36. For each of the RAS-vectors in the three-dimensional array, the fine-resolution azimuth process 36 performs four operations: windowing at 112, fine-resolution focus 118, Discrete Fourier Transform (DFT) 120, and correction for the coarse-resolution window roll off 122. The initial windowing operation at 112 is just a standard multiplication by a window function selected to meet sidelobe requirements. The fine-resolution focus operation 118 is another key element of the invention. It is the operation that corrects for motion through azimuth-resolution cells. The fine-resolution focus vector is the product of three separate vectors.

Each S-vector, i.e., each subaperture direction vector 220 from the input array 218 is multiplied at 110 by a first component that is a function of both coarse-azimuth and range bin numbers which corrects for spatially varying phase errors. The first component of the fine-resolution focus vector changes most rapidly and is synthesized directly in azimuth correction waveform 108, using parameters azimuth starting frequency $f_a$, azimuth phase $\phi_a$, and azimuth chirp $\gamma_a$ to save time.

The focus vector is also a function of dynamic motion information which is supplied from an external inertial measurement unit. This second component 116 of the fine-resolution focus vector is a slowly-varying part component dependant upon inertial measurement unit data and may be prepared in a computer.

The third component of the fine-resolution focus azimuth vector is necessary because the inertial measurement unit cannot measure the radar motion precisely enough to satisfy image quality requirements for high-resolution SAR. Thus, the invention incorporates a data-driven estimate of the unsensed phase error generated by an autofocus process 114. The autofocus process 114 requires input from the above-described fine-resolution azimuth processes; the invention has been designed to incorporate the autofocus process at this time to minimize the amount of processing required. A sharper image is obtained when the data is corrected for spatially variant phase errors prior to autofocus 114. Typically, autofocus algorithms presume that the spatially-variant phase errors are invariant which is not true in many actual cases. The process may be the phase-gradient autofocus process described in U.S. Pat. No. 4,924,229 herein incorporated by reference. Other known techniques for estimating the unsensed phase error may also be used, such as in U.S. Pat. No. 4,771,287 to Mims. Once the unsensed-phase errors are estimated by an autofocus process, they are removed by multiplying all of the radar data by an autofocus phase correction vector. The autofocus phase correction vector is multiplied by the fine-azimuth window vector, which is in turn multiplied by the product of the first and second components of the fine resolution focus vector.

Figure 5:
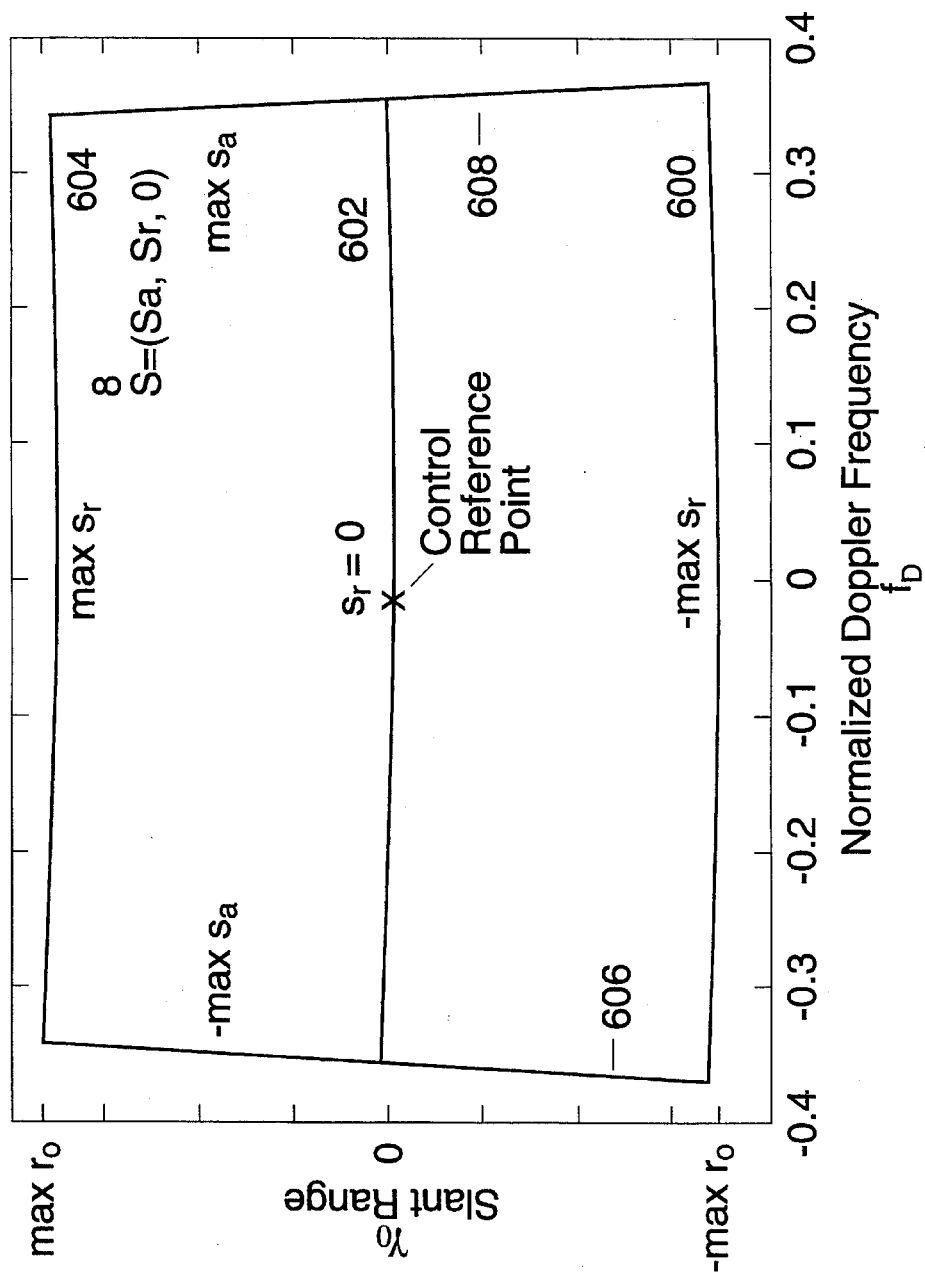
FIG. 5 is an image graphic of the imaging area slant range versus doppler frequency for $V_y=V_z=0$.

After multiplication of each $x_r(RI,AI,\cdot)$ vector by the window and fine-resolution focus vectors at 118, the resulting S-vector is Fourier transformed at 120. For each fixed range, a DFT is performed over a doppler frequency band of the vector from each coarse-azimuth bin which provides fine resolution in doppler frequency. The doppler frequency of a point scatterer is a function of both range and azimuth. In order to keep the pixel spacing in azimuth constant, it is necessary to vary the doppler frequency sampling as a function of range when the DFTs are performed. Therefore, the number of output samples, P, required from the DFT operation is approximately the ratio of the coarse-resolution sample spacing to the desired fine-resolution sample spacing. To implement the DFT, the chirp-z transform 120 is used. The fact that the process is able to remove the geometric distortion caused by range-doppler interaction is another of the key characteristics of the invention. SAR imaging maps the point $\mathbf{s}=(s_a,s_r,0)$ in the XY plane into $(r_o,f_D)$ in the range-doppler plane. Under this mapping, a rectangle in the XY plane is transformed into the shape shown in FIG. 65. Because of wavefront curvature, lines of constant $s_r$ map into curves 600, 602, 604 described by Equation (20). Also, the doppler bandwidth corresponding to a rectangular radar image is a function of slant range. This range-doppler interaction is indicated by the presence of $s_r$ in Equation (10) and accounts for the apparent greater bandwidth at near slant range shown in FIG. 5. It also explains why curves of constant $s_a \neq 0$ i.e., curves 606 and 608 are not vertical. Thus, by modifying the chirp-z transform parameters as a function of slant range, the data is mapped from slant range $r_o$ and doppler frequency $f_D$ grid onto a grid of $r_o$ and azimuth position. In this way the invention compensates for range-doppler interaction and produces an image with constant azimuth-pixel spacing. This is another advantage of the invention.

Another vector operation at 122 corrects for amplitude and phase effects of the coarse-resolution azimuth processing, sec 32 of FIG. 2. The result is a part of one range line corresponding to one coarse-resolution bin; and the compilation of all sequential range lines yield the complete radar image 226 at 126.

One of the joys of the invention is the inherent flexibility. Just about any parameter of any process step of the invention can be varied. As an example, the variable-PRF scheme used by the radar is important for real-time implementation, because it allows the motion-compensation vectors $F_{ca}$, $F_r$, $F_{rw}$, and $F_1$ to be produced in hardware. Note, however, that the invention does not require variable PRF. If the radar PRF is constant, it is necessary to determine the X-axis position by integrating $V_x$. Then the resulting x(t) is substituted into the equations for the motion-compensation vectors. When used this way, the invention is more sensitive to X-axis acceleration $a_x$. For the constant-PRF case, nonzero $a_x$ produces a quadratic phase error that is proportional to $s_a$. Small errors of this kind can be removed in the fine-resolution focus process. But if $a_x$ is too large, the amount of (coarse) azimuth resolution available before the last DFT is not adequate to remove all the phase error. So the variable-PRF embodiment of the invention is preferable.

The description of the invention given above specifies varying the radar center frequency and A/D sample rate, but it is possible to hold these two parameters constant. In this case, the processor can still form a high-quality image, but there are two disadvantages. First, the doppler-frequency band corresponding to a particular ground patch is increased, so more coarse bins must be retained. This increases the processor memory requirement. Second, some range-dependent phase errors remain in the dechirped baseband signal as indicated in Equation (6) that must be removed before fine-resolution processing. This can be accomplished by augmenting the fine-resolution focus vector at the expense of increased processing time.

Another modification relates to the second line of Equation (2) which stabilizes the dechirped baseband frequency associated with a central reference point. This stabilization can occur in two ways: as described by range processing 34 in FIG. 2; or by appropriate changes in the starting frequency and phase of the local oscillator. If the local oscillator is operated this way, then the vectors defined in Equations (8) and (14) are unnecessary. This modification simply involves some changes in programming of the specific processing steps and does not alter the structure of the radar.

FIG. 1 shows the radar operating in a broadside mode, i.e., the vector $u_a$ is parallel to the nominal motion path. The situation where $u_a$ is not parallel to the nominal motion path is termed squint mode. The modifications of the previous paragraph and the variable PRF scheme are extended to include a dependence on $V_y$. To operate the radar in the squint mode, the radar structure need not change. Also the radar center frequency and either the chirp rate or the A/D sample rate are modified as functions of the depression angle to the central reference point.

Although the invention has been described with respect to its preferred embodiment, for example a coarse-azimuth process using an FFT, it will be appreciated by persons skilled in the art that an FFT is only one mechanization of a filter bank. Therefore, alternative filter bank mechanizations are also disclosed. For example, special-purpose digital hardware can realize a bank of infinite-impulse-response filters.

Having described preferred embodiments of a novel imaging radar and method for compensating a radar (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

What is claimed is:

1. A pulsed synthetic aperture radar having real-time motion compensation, comprising:

(a) means to transmit a signal to a field of view;

(b) means to receive a returned signal scattered from said field of view;

(c) means to process said returned signal to obtain coarse-resolution in azimuth, then to obtain fine-resolution in range, and then to obtain fine-resolution in azimuth, all as functions of actual radar motion to create a real-time radar image of said field of view.

2. The radar of claim 1 wherein said means to transmit a signal further comprises means to adjust at least one of the following parameters of said transmitted signal on a pulse-to-pulse basis in response to radar motion: center frequency, starting phase, and chirp rate.

3. The radar of claim 2 wherein said means to receive said returned signal further comprises means to mix said returned signal with a local oscillator waveform and an A/D converter to convert said mixed signal to a digital dechirped baseband signal, said local oscillator waveform also having parameters of center frequency, starting phase, and chirp rate that can be varied on a pulse-to-pulse basis in response to radar motion.

4. The radar of claim 3 wherein said A/D converter samples said dechirped baseband signals as a function of radar motion.

5. The radar of claim 4 further comprising clocking means to control sampling locations and A/D sampling frequencies of said A/D converter.

6. The radar of claim 5 wherein said clocking means further comprises a sampling waveform phase generator, an analog bandpass filter, and a zero-crossing detector wherein said sampling waveform phase generator generates a sampling waveform having variable parameters in response to radar motion, said analog bandpass filter interpolates a voltage between discrete samples of said waveform, and said zero-crossing detector converts said interpolation to a square wave, and said square wave is gated to said, A/D converter.

7. The radar as in claim 5 wherein said dechirped baseband signal is arranged into overlapped subapertures of a F×M matrix where M is the number of columns in said matrix and is the number of azimuth samples in each of said subapertures, and F is the number of rows in said matrix and is the number of samples in each of said dechirped baseband pulses.

8. The radar as in claim 7 wherein said means to process said returned signal to obtain coarse-resolution in azimuth includes means to process each of said subapertures in coarse-resolution azimuth which further comprises:

(a) means to constrain sidelobes;

(b) means to stabilize a doppler frequency associated with a central reference point in said field of view;

(c) means to sort said columns of said subapertures into coarse-resolution azimuth bins wherein each of said coarse-resolution azimuth bins has a same doppler frequency bandwidth and means to eliminate any of said dechirped baseband signals outside of a desired doppler frequency bandwidth;

(d) means to downsample an azimuth sample rate of said azimuth samples by a factor of an amount of delay between each of said subapertures; and (e) means to remove signal transmission effects that are a function of doppler frequency.

9. The radar of claim 8 wherein said means to constrain sidelobes is a window function performed on each of said rows of said subaperture.

10. The radar of claim 8 wherein said means to stabilize a doppler frequency of a central reference point in said field of view further comprises means to generate a course-resolution azimuth focus waveform having parameters frequency, phase, and chirp rate which vary as a function of radar motion, and means to multiply each of said columns of said subaperture by said coarse-resolution azimuth focus waveform to generate rows of coarse-azimuth stabilized waveforms in each of said subaperture.

11. The radar of claim 10 wherein said means to sort said columns of said subapertures into coarse-resolution azimuth bins and means to eliminate any of said dechirped baseband signals outside of a desired doppler frequency bandwidth and said means to downsample an azimuth sample rate of said azimuth samples by a factor equal to said delay between said subapertures further comprises means to perform a fast fourier transform on an output of said means to stabilize a doppler frequency of said central reference point.

12. The radar as in claim 11 wherein said means to process said returned signal to obtain fine-resolution in range, further comprises:

(a) means to constrain sidelobes;

(b) means to correct range migration of said dechirped baseband signals in a subaperture as a function of doppler frequency;

(c) means to compress columns of said subapertures into fine-resolution range bins and means to eliminate any of said dechirped baseband signals outside of a desired range;

(d) means to remove signal transmission effects that are a function of range.

13. The radar of claim 12 wherein said means to constrain sidelobes is a window function performed on each of said columns of said subaperture.

14. The radar of claim 12 wherein said means to stabilize range migration of said dechirped baseband signals in a subaperture as a function of doppler frequency further comprises means to stabilize said central reference point in range with a first range waveform, and then to stabilize all other points of said field of view of said subaperture with a second range waveform having parameters frequency, phase, and chirp rate which vary as a function of radar motion and of doppler frequency, and means to multiply each of said columns of each of said subaperture by said first and second range focus waveforms to obtain a range stabilized waveforms.

15. The radar of claim 12 wherein said means to compress columns of said subapertures into fine-resolution range bins and said means to eliminate any of said dechirped baseband signals outside of a desired range further comprise means to perform a fast fourier transform on said range stabilized waveforms.

16. The radar of claim 15 wherein the output of said means to process said returned signal to obtain coarse-resolution in azimuth and fine-resolution in range operates on each of said subapertures, and said means to obtain fine-resolution in azimuth further comprises means to combine all of said coarse-resolution azimuth bins and said fine-resolution range bins of all of said subapertures into a large ordered array as input into said means to process said returned signal to obtain fine-resolution in azimuth.

17. The radar as in claim 16 wherein said means to process said returned signal to obtain fine-resolution in azimuth, further comprises:

(a) means to constrain sidelobes;

(b) means to correct for spatially varying phase errors and to stabilize azimuth migration of said array as a function of radar motion;

(c) means to obtain equally spaced samples in azimuth; and (d) means to remove artifacts of coarse-resolution azimuth processing.

18. The radar as in claim 17 wherein said means to constrain said sidelobes is a window function.

19. The radar as in claim 17 wherein said means to correct for spatially varying phase errors and to stabilize azimuth migration of said array as a function of radar motion further comprises:

(a) means to generate a first fine-resolution azimuth focus waveform having parameters frequency, phase, and chirp rate which vary as a function of lower ordered terms of measured radar motion and of range and azimuth bins of said array, and means to multiply each of said subapertures of said array by said first fine-resolution azimuth focus waveform;

(b) means to generate a second fine-resolution azimuth focus waveform as a function of higher ordered terms of measured radar motion and of range and azimuth bins of said array, and means to multiply each of said subapertures of said array by said second fine-resolution azimuth focus waveform; and (c) an autofocus means, interactive with said means to generate said first and second fine-resolution azimuth focus waveforms, to correct for unmeasured phase errors.

20. The radar of claim 19 wherein said means to obtain equally spaced samples in azimuth further comprise means to perform a discrete fourier transform on an output of said phase error correcting means and said azimuth migration stabilizing means which varies doppler bandwidth and sample spacing as a function of range.

21. The radar of claim 19 wherein at least one of the following said waveforms are generated in at least one integrated circuit: local oscillator waveform, said coarse-resolution azimuth waveform, said first and second fine-resolution azimuth waveforms, first and second range waveforms, and said transmitted signals.

22. A pulsed synthetic aperture radar having real-time motion compensation, comprising:

(a) means to transmit a signal to a field of view and means to adjust at least one of the following parameters of said transmitted signal on a pulse-to-pulse basis in response to actual radar motion: center frequency, starting phase, and chirp rate;

(b) means to receive a returned signal scattered from said field of view and means to mix said returned signal with a local oscillator waveform and an A/D converter having A/D sampling locations and sampling frequencies which are controlled as a function of radar motion, said A/D converter to convert said mixed signal to a digital dechirped baseband signal, said local oscillator waveform also having parameters of center frequency, staring phase, and chirp rate that can be varied on a pulse-to-pulse basis in response to radar motion;

(c) means to process said returned signal to create a real-time radar image of said field of view.

23. A pulsed synthetic aperture radar, comprising:

(a) means to transmit a signal to a field of view;

(b) means to adjust at least one of the following parameters of said transmitted signal on a pulse-to-pulse basis in response to actual radar motion: center frequency, starting phase, and chirp rate;

(c) means to receive a returned signal scattered from said field of view;

(d) means to process said returned signal using overlapping subapertures to obtain, first, coarse-resolution in azimuth, then to obtain fine resolution in range, and then to obtain fine-resolution in azimuth, all as function of actual radar motion to create a real-time radar image of said field of view.

* * * * *